(12) United States Patent
Kose et al.

(10) Patent No.: US 11,400,763 B2
(45) Date of Patent: Aug. 2, 2022

(54) TIRE TREAD

(71) Applicants: Sadi Kose, Taylors, SC (US); Mark Daurer, Simpsonville, SC (US); Jason Zychiewicz, Simpsonville, SC (US); Robert C. Lawson, Pelzer, SC (US); David Scott Morgan, Greenville, SC (US)

(72) Inventors: Sadi Kose, Taylors, SC (US); Mark Daurer, Simpsonville, SC (US); Jason Zychiewicz, Simpsonville, SC (US); Robert C. Lawson, Pelzer, SC (US); David Scott Morgan, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 334 days.

(21) Appl. No.: 16/329,082

(22) PCT Filed: Aug. 31, 2017

(86) PCT No.: PCT/US2017/049527
§ 371 (c)(1),
(2) Date: Feb. 27, 2019

(87) PCT Pub. No.: WO2018/045125
PCT Pub. Date: Mar. 8, 2018

(65) Prior Publication Data
US 2019/0225026 A1 Jul. 25, 2019

(51) Int. Cl.
*B60C 11/03* (2006.01)
*B60C 11/13* (2006.01)

(52) U.S. Cl.
CPC .......... *B60C 11/0323* (2013.01); *B60C 11/13* (2013.01); *B60C 11/1307* (2013.01); *B60C 2011/1338* (2013.01)

(58) Field of Classification Search
CPC ......... B60C 11/1307; B60C 2011/1338; B60C 11/0323
See application file for complete search history.

(56) References Cited

U.S. PATENT DOCUMENTS 2,661,041 A  12/1953  Walsh
3,511,290 A  5/1970  Kutsmichel
(Continued)

FOREIGN PATENT DOCUMENTS

EP  0323165 A2  7/1989
GB  1278538 A  6/1972
(Continued)

OTHER PUBLICATIONS

International Search Report and Written Opinion for PCT/US2016/049769 dated May 24, 2017.
(Continued)

*Primary Examiner* — Timothy Kennedy
*Assistant Examiner* — Farah Taufiq
(74) *Attorney, Agent, or Firm* — Hahn Loeser & Parks LLP; Bret A. Hrivnak (57) ABSTRACT

A tire tread (10) having one or more grooves (20₁, 20₂), one or more split bridges (24) arranged in each groove (20₁, 20₂), wherein the one or more split bridges (24) having a narrow gap (26) arranged along the width of the corresponding split bridge (24) and extending fully across the length and height of the corresponding split bridge (24), a top side of the one or more split bridges (24) is arranged closest to an outer side (16) of the tread (10), at least a portion of the top side is spaced apart from the outer side (16) of the tread
(Continued)

(10) in a direction of a depth of the groove ($20_1$, $20_2$) by a variable distance, and a bottom side of the one or more split bridges (24) is spaced apart from a bottom of the groove ($20_1$, $20_2$) to form a void between the corresponding split bridge (24) and the bottom of the groove ($20_1$, $20_2$).

16 Claims, 5 Drawing Sheets

(56) References Cited

U.S. PATENT DOCUMENTS

| | | | |
|---|---|---|---|
| 5,022,448 A | 6/1991 | Ochia | |
| 5,501,258 A | 3/1996 | Sulkowski | |
| 6,119,744 A | 9/2000 | Tsukagoshi | |
| 6,484,772 B1 | 11/2002 | DeLabareyre et al. | |
| 9,004,124 B2 | 4/2015 | Le-Hen | |
| 2004/0112494 A1 | 6/2004 | Colombo | |
| 2009/0277551 A1 | 11/2009 | Yukawa | |
| 2012/0273107 A1 | 11/2012 | Le-Hen | |
| 2014/0060717 A1* | 3/2014 | Morgan | B60C 11/0309 152/209.21 |
| 2016/0159160 A1* | 6/2016 | Kaji | B60C 11/0309 152/209.21 |
| 2016/0318348 A1 | 11/2016 | Cambon et al. | |
| 2017/0225519 A1 | 8/2017 | Letz et al. | |
| 2019/0160882 A1* | 5/2019 | Woudstra | B60C 11/1307 |

FOREIGN PATENT DOCUMENTS

| | | | |
|---|---|---|---|
| JP | 03-086605 A | | 4/1991 |
| JP | 05-345506 A | | 12/1993 |
| JP | 06-191231 A | | 7/1994 |
| JP | 06191231 A | * | 7/1994 |
| JP | 2003159910 A | | 6/2003 |
| JP | 2004351991 | | 12/2004 |
| JP | 2006137231 A | | 6/2006 |
| JP | 2010030596 A | | 2/2010 |
| JP | 2013-169887 A | | 9/2013 |
| KR | 1020070002824 A | | 1/2007 |
| KR | 705788 B1 | | 4/2007 |
| WO | 1020070002824 A1 | | 6/2011 |
| WO | 2012148406 A1 | | 11/2012 |
| WO | 2015086622 A1 | | 6/2015 |
| WO | 2015185233 A1 | | 12/2015 |

OTHER PUBLICATIONS

International Search Report and Written Opinion for PCT/US2017/049527 dated Nov. 8, 2017.

* cited by examiner

TIRE TREAD

CROSS-REFERENCE TO RELATED APPLICATIONS

This application claims priority to, and the benefit of, International patent application no. PCT/US2016/049769, filed Aug. 31, 2016 with the U.S. Patent Office (acting as a Receiving Office), which is herein incorporated by reference.

BACKGROUND

Field

This invention relates generally to tire treads having split bridges extending across grooves, and tires incorporating said treads.

Description of the Related Art

A reduction in rolling resistance, that is, a reduction in the loss of energy, as a tire operates has become an important goal for tire designers. This energy loss is exhibited in the generation of heat. Amongst other factors, a tire's energy loss is impacted by the amount of deformation that the tread rubber undergoes as the tire rolls into, through, and out of the contact patch. The contact patch is also referred to as a tire footprint, and forms the area of contact between the tire and the surface upon which the tire operates. In such instances, the tread is compressed in a direction perpendicular to the ground (radial direction of the tire). This compression, driven by the weight of the vehicle as well as the tread's reaction to vertical asperities in the road surface, consumes energy through shear deformation, and the Poisson effect. Also, shearing forces and resulting energy losses are exerted on the tread as it deforms to meet the ground in the circumferential and lateral directions of the tire, due to the curved structure of the tire conforming to the road surface. Finally, under pure rolling in the contact patch, shear forces in the rolling direction are naturally developed in the tread between the belts and the adherent contact with the ground. These shear forces under pure rolling also consume energy.

Consequently, one way to decrease these energy loss effects and the resulting increase in rolling resistance associated with them, is to add features that decrease the deformation of the tread as the tire rolls into, and out of the contact patch. Yet another possibility for reducing these energy losses concerns the way in which the tread is equipped with incisions or notches to reduce the strains placed on the tread as it rolls into and out of the contact patch. For example, European Patent No. EP0787601 describes that it is possible to achieve this goal by configuring the tread with a plurality of incisions that are oriented laterally that have a specified spacing according to the geometrical dimensions of the tire. While this technique lowers rolling resistance and can be effective for snow traction, it may not have a significant impact on improving hydroplaning (wet) performance.

Accordingly, it is desirable to design a tire tread that is able to lower rolling resistance and improve snow performance, while also maintaining hydroplaning performance.

SUMMARY

The invention includes tire treads and tires including said tire treads. The tread includes a tread width extending between a first lateral side edge and a second lateral side edge of the tire tread, a tread thickness extending from an outer, ground-engaging side of the tire tread to a bottom side of the tire tread, the tread thickness being perpendicular to the tread width, and a tread length extending perpendicular to both the tread width and the tread thickness. In particular embodiments, the tread further includes a groove having a depth extending into the tread thickness from the outer, ground-engaging side of the tire tread and to a bottom thereof, the groove also having a length and a width, the length being dimensionally greater than the width, and the length, width, and depth being perpendicular to each other. The tread further includes one or more split bridges arranged in the groove, each of the one or more split bridges having a length extending in a direction of the groove length, a height extending in a direction of the groove depth, and a width extending across the width of the groove, each of the one or more the split bridges having a discontinuity arranged along the width of the split bridge and extending fully across the length and height of the corresponding split bridge. Further, each of the one or more split bridges has a bottom side arranged closest to the bottom of the groove, the bottom side being spaced apart from the bottom of the groove to form a void between the corresponding split bridge and the groove bottom. Each of the one or more split bridges also has a top side arranged closest to the outer, ground-engaging side of the tread, where at least a portion of the top side is spaced apart from the outer, ground-engaging side in the depth of the groove by a variable distance.

The foregoing and other objects, features, and advantages will be apparent from the following more detailed descriptions of particular embodiments, as illustrated in the accompanying drawings wherein like reference numbers represent like parts of particular embodiments.

BRIEF DESCRIPTION OF THE DRAWINGS

FIG. 8B is a cross-sectional view of the split bridge shown in FIG. 8A taken along line 8B-8B; and, FIG. 8C is a cross-sectional view of the split bridge shown in FIG. 8A taken along line 8C-8C.

DETAILED DESCRIPTION OF PARTICULAR EMBODIMENTS

The present invention includes tire tread and tires including such tire treads. The tire treads having one or a plurality of split bridges extending substantially or fully across a groove width, where the tread is configured to improve rolling resistance and snow performance, while also maintaining hydroplaning performance.

The tread has a tread width extending between a first lateral side edge and a second lateral side edge of the tire tread, which is referred to as the widthwise or lateral direction. The tread also includes a tread thickness extending from an outer, ground-engaging side of the tire tread to a bottom side of the tire tread, which is referred to as the depthwise direction, the tread thickness extending perpendicular to the tread width. The tread thickness may be any thickness, such as greater than or equal to 7 millimeters (mm), for example. The tread also includes a tread length extending perpendicular to both the tread width and the tread thickness, and which is referred to as the lengthwise or longitudinal direction. When the tread forms a component of a tire, the tread length extends in a circumferential direction of the tire, the tread thickness extends in a radial direction of the tire, and the tread width extends generally in an axial direction of the tire.

The tread also includes at least one groove, forming one groove or a plurality of grooves, where any such groove has a depth extending into the tread thickness from the outer, ground-engaging side of the tire tread and to a bottom of the groove. A groove also has a length and a width, the length being dimensionally greater than the width, the length, width, and depth being perpendicular to each other. The groove may form any desired groove, including any lateral groove or longitudinal groove. It is appreciated that a plurality of grooves may comprise longitudinal grooves, lateral grooves, or any combination thereof. A longitudinal groove extends in a direction oriented at an angle measuring less than 45 degrees from the direction defining the tread length, while a lateral groove extends in a direction oriented at an angle measuring 45 degrees or less from the direction defining the tread width. It is appreciated that any groove may extend lengthwise along any path, which may be a linear or non-linear path. A non-linear path may form any non-linear path, including any curvilinear or alternating path contemplated herein, where an alternating path includes a stepped or zig-zagging path, or a sinusoidal path or any other undulating path. Non-linear paths are also described further below with respect to other features.

The tire tread includes one or more split bridges arranged in the groove. A split bridge is formed of one or more projections extending outwardly from one or both opposing sides of a groove, where the opposing sides define a width of the groove. For example, in certain embodiments, the split bridge is formed by a pair of opposing projections extending into the groove from opposing sides of the groove that define a width of the groove, with a discontinuity arranged between terminal ends of each projection. By further example, in other embodiments, the split bridge is formed of a projection extending into the groove from one of the opposing sides of the groove that define a width of the groove, with a discontinuity arranged between a terminal end of the projection and the other of the opposing sides of the groove forming the groove width. As for the discontinuity, the discontinuity is formed between opposing sides of certain structure associated with the split bridge. For example, with reference to the first example presented above, the structure forming the opposing sides of the discontinuity comprises the terminal ends of the pair of opposing projections. By further example, with reference to the second example presented above, the structure forming the opposing sides of the discontinuity comprises the one side of the groove width and the terminal end of the projection extending from the opposing side of the groove width. It is appreciated that a discontinuity may form a narrow gap or a laceration, or any combination of one or more narrow gaps and/or one or more lacerations. It is also appreciated that the split bridge may comprise any desired split bridge having a top side arranged a variable distance from the outer, ground-engaging side, with or without a bottom side optionally arranged a variable distance from the outer, ground-engaging side, as described above.

It is also appreciated that any groove may include one or more, or a plurality of split bridges as described herein. When providing a plurality, the plurality of split bridges are arranged along the groove in a spaced-apart arrangement (such as in an array, for example) in the direction of the length of the groove (that is, in the lengthwise direction of the groove). In any embodiment, each of the one or more bridges has a length extending in the direction of the length of the groove, a height extending in the direction of the depth of the groove (that is, in the depthwise direction of the groove), a width extending in the direction of the width of the groove (that is, in the widthwise direction of the groove) and substantially or fully across the width of the groove, whereby a discontinuity is arranged at a location along the width of a corresponding split bridge and extending fully across the length and height of the corresponding split bridge. In the case of a split bridge, the length is not necessarily greater than the width of the split bridge. It is appreciated that any split bridge may extend partially or fully along a length of a groove, or the length of a side of the groove associated with a tread element (stated differently, a side of a tread element forming a portion of the groove length). For example, in certain instances, the length of a split bridge is greater than or equal to fifty percent (50%) or seventy-five percent (75%) of the length of a side of an adjacent tread element. A tread element may form a rib or a tread block. In one example, a rib is formed when the tread element has a length extending continuously the full length of the tread such that no groove extends fully across a width of the tread element (otherwise it is parsed to form a tread block), although one or more sipes may or may not extend across the tread element while forming a rib. It is appreciated that a groove has a width greater than a width of a sipe. In forming a rib, the width of the tread element is bounded by spaced-apart longitudinal grooves or one longitudinal groove and a lateral side of the tread. In forming a tread block, a tread block has the above-referenced characteristics of a rib except that the tread element does not have a length extending continuously along the full length of the tread. In other words, for a tread block, the width of the tread element is bounded by spaced-apart longitudinal grooves or one longitudinal groove and a lateral side of the tread as well as having a tread element length that is bounded by a single lateral groove or a pair of spaced-apart lateral grooves. In certain instances, the sum of all lengths of all one or more split bridges arranged within a groove is equal to or greater than fifty percent (50%) or equal to or greater than seventy-five percent (75%) of the length of the groove.

Each of the one or more split bridges has a bottom side arranged closest to the bottom of the groove, the bottom side being spaced apart from the bottom of the groove to form a void between the corresponding split bridge and the groove bottom. This void is referred to as a submerged void, and it is appreciated that the submerged void may form any desired void. In certain exemplary instances, the submerged void forms a groove (that is, a submerged groove) underneath the split bridge, where the groove extends the full or partial length of the split bridge. By extending the full length of the split bridge, water may be passed underneath the split bridge to maintain or improve wet tire performance, such as with regard to hydroplaning performance. It is appreciated that this submerged void or groove may have a width that is equal to or less than the width of the groove within which the split bridge is arranged, which may be any groove contemplated herein.

For each split bridge, a top side of the split bridge is spaced apart from the bottom side of the split bridge to define the split bridge height. The top side is a side of the split bridge directed towards or facing the outer, ground-engaging side of the tread. The top side can also be described as being the side of the split bridge arranged closest, as a whole, to the outer, ground-engaging side. The top side generally forms the upper extent of a corresponding split bridge closes to the outer, ground-engaging side. At least a portion of the top side, or, in particular variations, the entire top side, is spaced apart from the outer, ground-engaging side in the direction of the depth of the groove by a variable distance, meaning in certain embodiments, a portion of the top side extends from (is not spaced from) the outer, ground-engaging side of the tread.

It is stressed that the top side of a split bridge extends a variable distance from the outer, ground-engaging side of the tread. This allows different portions of the split bridge, by way of the top side, to become exposed to and thereby to form a portion of the outer, ground-engaging side of the tread as the tread wears and the tread thickness is reduced. Otherwise, if the top side is spaced apart from the outer, ground-engaging side of the tread by a constant distance along its length, the entire length of the split bridge becomes exposed simultaneously to form a portion of the outer, ground-engaging side of the tread, which in an instant can eliminate a sizable amount of the surface void otherwise formed by the groove void. By having different portions of the split-bridge form part of the outer, ground-engaging side over time, there is not an immediate loss of surface void. Optionally, in certain embodiments, the bottom side of the split-bridge is also arranged a variable distance from the outer, ground-engaging side of the tread. In this way, after a height of certain portions of the split-bridge are worn away as the tread thickness wears, these portions of the split bridge are removed from the outer, ground-engaging side while other portions of the split bridge length are exposed to and form a portion of the outer, ground-engaging side. This avoids the gradual addition of the entire length of a split bridge to the outer, ground-engaging side by only permitting a portion of the split bridge length to ever form a portion of the outer, ground-engaging side of the tread. It is appreciated that the height of a split bridge may be constant or variable along the split bridge length and/or width.

In extending a variable distance, any corresponding top side or bottom side may extend along any desired path. For example, any top or bottom side may be arranged a variable distance from the outer, ground-engaging side while also extending along a linear path or a non-linear path. The linear path is inclined relative to the outer, ground-engaging side or the bottom of the groove. A non-linear path may, for example, form any curvilinear or alternating path extending in different directions. For an alternating path, the non-linear path alternates at least once between extending in different depthwise directions of the groove as the top side extends in the lengthwise direction of the groove. As noted above, an alternating path may form a stepped path or a zig-zagging path, for example. An alternating path may also form an undulating path including one or more undulations, such as with a sinusoidal path. In certain instances, when the split bridge is formed by a pair of opposing projections, the top side of each projection of the pair of opposing projections extends along the non-linear path substantially, that is, each top side extends substantially along the same non-linear path. In extending along substantially the same non-linear path, it is appreciated that one of the projections may extend substantially along the same non-linear path as the other projection of the pair, even though one projection may extend longer than the other projection. In extending along substantially the same non-linear path, in certain instances, the top side for each projection is spaced apart from the outer, ground-engaging side by substantially the same distance as each top side extends along the non-linear path.

It is appreciated that, in certain embodiments, the discontinuity at least partially or completely forms a laceration between opposing sides of the split bridge forming the discontinuity. The laceration provides no gap between opposing sides of the structure forming the discontinuity, such that the portion of the discontinuity formed of the laceration has a thickness equal to zero, where along the laceration the spacing between opposing sides of the structure forming the discontinuity is equal to zero. A laceration is formed by a slicing operation, which may be formed using any known method or structure. For example, slicing may occur as the tread is being demolded from a mold, such as where a portion of the mold has a slicing edge. By further example, slicing may occur after the tread has been demolded. When the discontinuity is a laceration, the split bridge is described as having a width extending completely or fully across the width of a corresponding groove. It is appreciated that the laceration may extend in any direction of the split bridge length, height, and/or width, and along any linear or non-linear path. The non-linear path may form any non-linear path, including any curvilinear or alternating path contemplated herein. As stated elsewhere herein, an alternating path alternates at least once between extending in different upward and downward directions of the groove depth, and may form a stepped or zig-zag path, for example. When the path alternates a plurality of occasions, the path includes a plurality of peaks and/or troughs. An alternating path may form an undulating path, such as a sinusoidal path, for example.

In other embodiments, the discontinuity forms a narrow gap. For example, a narrow gap may be formed during a molding operation, where the narrow gap is molded into the tread using a molding element. A narrow gap has a width extending in a direction of the split bridge width or of the groove width, while the narrow gap and its width also extend in both the direction of the split bridge height and length. It is appreciated that the width of the narrow gap provides for at least partial closure of the narrow gap when the corresponding split bridge is arranged within the contact patch (i.e., tire footprint) during tire operation, where partial closure connotes contact between the opposing sides of the narrow gap at least at one location along the narrow gap. For example, in certain instances, the narrow gap is a sipe having a width equal to or less than 1 mm. In further instances, the narrow gap is a sipe having a width equal to or less than 0.5 mm. It is appreciated that the width of the narrow gap may be constant or variable in a direction of the length and/or height of a split bridge. It is appreciated that the narrow gap may form any desired sipe. For example, in certain instances, the narrow gap forms a sipe having a width formed of a thinner portion fully or partially surrounded by a thicker portion, the thicker portion forming a thicker portion of the narrow gap and the thinner portion forming a thinner portion of the narrow gap. It is also appreciated that the narrow gap may form any teardrop sipe. In particular instances, the teardrop sipe comprises a sipe portion and a void portion arranged at a terminal end of the sipe portion, the sipe portion forming a sipe extending into the split bridge from the top side to the void portion arranged at the other end of the sipe portion opposite the top side, the void portion having a width greater than the sipe portion. It is also appreciated that the width of the narrow gap may extend along any desired path in any direction of the split bridge height and length. Any such path may be linear or non-linear, where the non-linear path may form any non-linear path, including any curvilinear or alternating path contemplated herein.

Particular embodiments of the tire treads discussed above will now be described in further detail below in association with the figures filed herewith.

Figure 1:
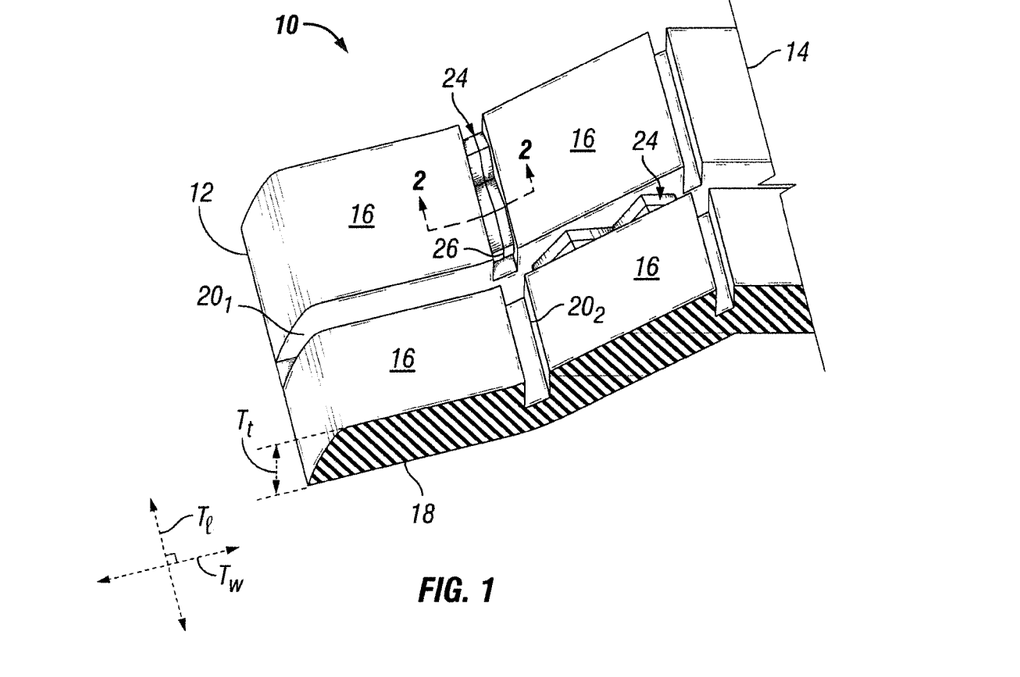
FIG. 1 is a partial perspective view of a tire tread having both a lateral groove and a longitudinal groove and a plurality of tread elements, where each of the grooves includes a split bridge according to an exemplary embodiment of the invention.

With reference to FIG. 1, an exemplary tire tread 10 is shown having a tread width $T_w$ extending in a widthwise (i.e., lateral) direction between a first lateral side edge 12 of the tire tread 10 and a second lateral side edge 14 of the tire tread 10. First lateral side edge 12 and second lateral side edge 14 of the tire tread 10 are opposing lateral side edges. Each of the first lateral side edge 12 and the second lateral side edge 14 form a terminal side of the tread width $T_w$. The tire tread 10 also has a tread thickness $T_t$, which extends in a depthwise direction from an outer, ground-engaging side 16 of the tire tread 10 to a bottom side 18 of the tire tread 10. The tread thickness $T_t$ extends in a direction perpendicular to the direction in which the tread width $T_W$ extends. While the tire tread 10 may have any tread thickness $T_t$, the tire tread 10 in particular embodiments has a tread thickness $T_t$ greater than or equal to 7 millimeters. Further, the tire tread 10 has a tread length $T_l$, which extends in a direction perpendicular to both the direction in which the tread width $T_W$ extends and the direction in which the tread thickness $T_t$ extends, both of which have been previously discussed. In a further embodiment, the tire tread 10 is attached to a tire carcass to form a tire. The tire may be either a pneumatic or non-pneumatic tire.

Figure 2:
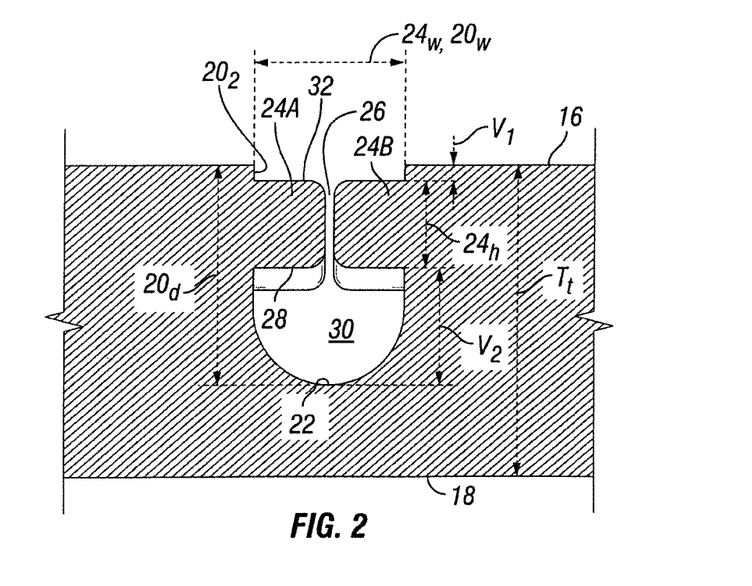
FIG. 2 is a cross-sectional view of one of the split bridges shown in FIG. 1 taken along line 2-2.
Figure 3:
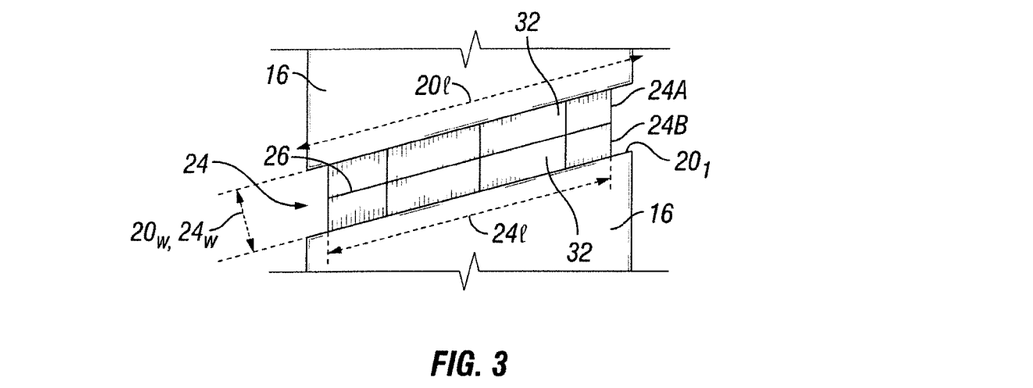
FIG. 3 is a top view of the other one of the split bridges shown in FIG. 1.

As further illustrated in FIGS. 1-3, the tire tread 10 further includes a pair of grooves 20 each having a depth $20_d$ extending into the tread thickness $T_t$ from the outer, ground-engaging side 16 of the tire tread 10 to a bottom 22 of the groove 20. Each groove 20 further has a length $20_l$, and a width $20_w$, the length $20_l$ being dimensionally greater than the width $20_w$. For each groove 20, the length $20_l$, width $20_w$, and depth $20_d$ of the groove 20 are all perpendicular to each other. In the embodiment shown, one groove 20 is a lateral groove 20-1 where the length $20_l$ of the groove 20 extends primarily between the first lateral side edge 12 of the tire tread 10 and the second lateral side edge 14 of the tire tread 10. The other groove 20-2 is a longitudinal groove where the length $20_l$ of the groove 20 extends primarily in the tread length $T_l$. In further embodiments, tire tread 10 may include additional grooves 20, which may be lateral grooves, longitudinal grooves, or a combination thereof.

As stated previously, generally, each split bridge is formed of one or more projections extending from one or both pair of sides forming a width of a corresponding groove. Each split bridge also includes a discontinuity arranged along the width of the split bridge. With reference to the exemplary embodiment shown in FIGS. 1-3, each groove 20 includes a split bridge 24 having a pair of projections 24A, 24B, each projection 24A, 24B extending opposite one another from one of a pair of opposing sides of the groove 20 that which together define the groove width $20_w$. It follows, in this embodiment, that discontinuity 26 is arranged between a terminal end of each projection of the pair of projections 24A, 24B. As can be seen, discontinuity 26 is arranged along the width $20_w$ of the groove 20 and extends the full height $24_h$ and length $24_l$ of split bridge 24, thereby forming a "discontinuity" along the split bridge. While it is appreciated that discontinuity 26 may form any laceration or a narrow gap contemplated herein, in the embodiment shown the discontinuity 26 is a narrow gap having any width $26_w$ contemplated herein. For example, the narrow gap may be 0.1 to 0.5 millimeter (mm) wide. In a different exemplary embodiment illustrated in FIG. 5, split bridge 24 is formed of a single projection extending from one side of a pair of opposing sides of the groove 20 defining the groove width $20_w$. Thus, in these embodiments, the narrow gap 26 is arranged between a terminal end of the single projection and the other side of the pair of opposing sides of the groove 20.

Figure 6:
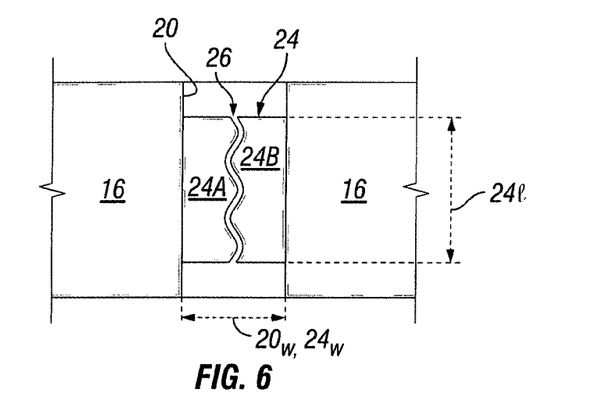
FIG. 6 is a top view of a split bridge according to another embodiment of the invention.
Figure 7:
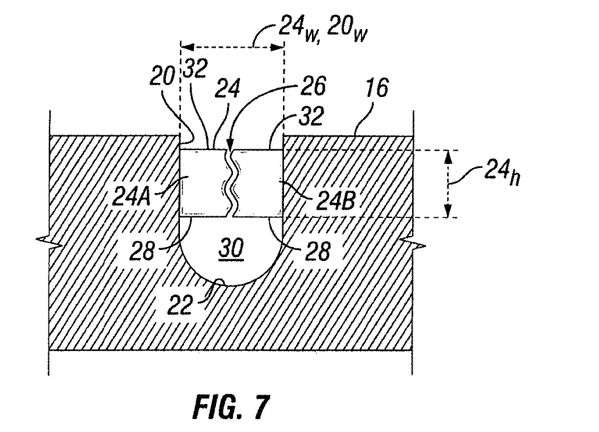
FIG. 7 is a side sectional view of the split bridge provided in FIG. 6.
Figure 8A:
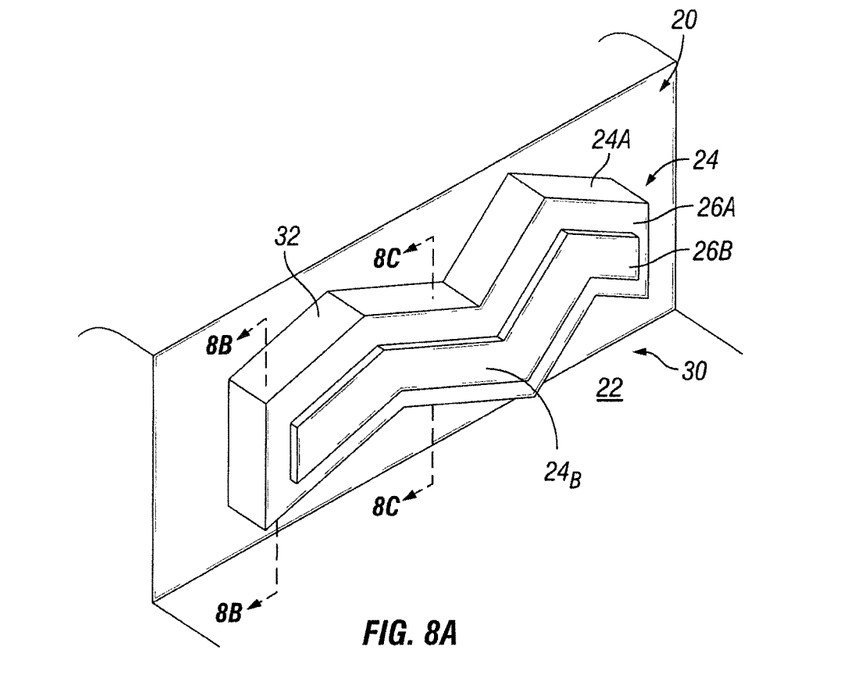
FIG. 8A is a perspective view of one portion of a split bridge according to an alternate embodiment of the invention.
Figures 8B, 8C:
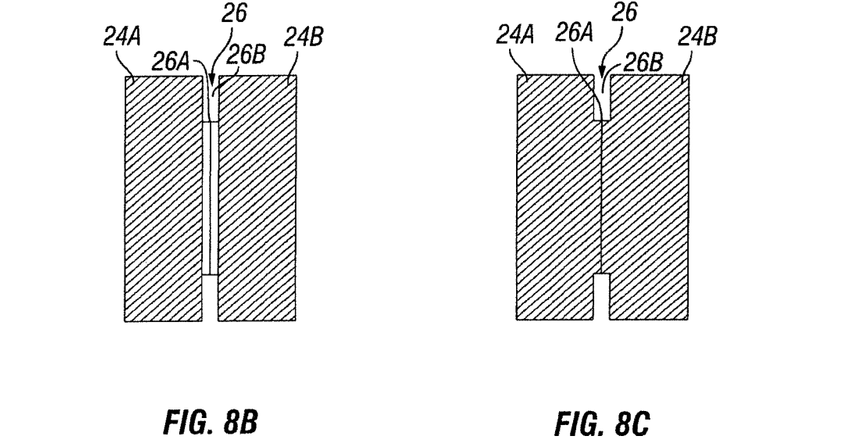

It is appreciated that when the discontinuity forms a narrow gap, in particular instances, the narrow gap forms a sipe that may form any desired sipe of any shape and configuration. Any such sipe generally has a width measured in a direction of the split bridge width and it is appreciated that the sipe width may be constant or variable. It is also appreciated that the sipe width may extend in the direction of the split bridge height and/or length along any linear or non-linear path. For example, in the exemplary embodiment shown in FIG. 2, the discontinuity 26 forms a narrow gap that is a sipe having a width $26_w$ that extends along a linear path in each of the directions of the split bridge height $24_h$ and length $24_l$. Likewise, in the exemplary embodiment shown in FIG. 5, a narrow gap 26 forming a sipe is shown having a width $26_w$ that extends along a linear path in each of the directions of the split bridge height $24_h$ and length $24_l$. In the exemplary embodiment shown in FIG. 6, a discontinuity 26 forms a sipe extending along a non-linear path in a direction of the split bridge length $24_l$. The non-linear path is an alternating path that undulates to form a plurality of undulations. In FIG. 7, the sipe of FIG. 6 is shown to extend along a non-linear path in a direction of the split bridge height $24_h$, the non-linear path is an alternating path undulating to form a plurality of undulations. By yet further example, in another exemplary embodiment shown in FIGS. 8A-8C, a discontinuity 26 can be described as forming a variable width sipe having a thinner portion 26A and a thicker portion 26B, where the width of each thinner portion 26A and thinner portion 26B is measured in the direction of the split bridge width $24_w$. In this embodiment, thinner portion 26A is surrounded by thicker portion 26B, but as discussed previously, other variations are contemplated. It is also appreciated that the thinner and thicker portions 26A, 26B may measure any sipe thickness contemplated herein, so long as the thicker portion is greater in width than the thinner portion. In certain embodiments, each of thicker portion and the thinner portion has a width measuring any width contemplated herein for any discontinuity 26 contemplated in any other embodiment. Additionally, it is appreciated that, in other embodiments, the thinner and/or thicker portions may extend in any direction along any linear or non-linear path.

With continued reference to the exemplary embodiment shown in FIGS. 1-3, each of the split bridges 24 has a length $24_l$, which extends in the direction of the corresponding groove length $20_l$. Further, each of the one or more split bridges 24 has a height $24_h$ which extends in the direction of the groove depth $20_d$ from a top side 32 of the each corresponding split bridge 24 to a bottom side 28 of the corresponding split bridge 24. Each of the one or more split bridges 24 also has a width $24_w$ extending in the direction of groove width $20_w$ of the groove 20 and substantially or fully across the groove width $20_w$.

With continued reference to the embodiment shown in FIGS. 1-3, the top side 32 of each split bridge 24 is the side arranged closest to, or facing, the outer, ground-engaging side 16 of the tire tread 10. In the embodiment shown, the entire top side 32 for each split bridge 24 is spaced fully apart from the outer, ground-engaging side 16 in the direction of the groove depth $20_d$ by a variable distance $V_1$. Further, the bottom side 28 of each split bridge 24 is the side arranged closest to, or facing, groove bottom 22. The bottom side 28 of each split bridge 24 is spaced apart from the bottom 22 of the groove 20 to form a void 30 between the corresponding split bridge 24 and the groove bottom 22. As best shown in FIG. 2, the bottom side 28 of each split bridge 24 is spaced apart from the bottom 22 of the groove 20 by a variable distance $V_2$ along the split bridge length $24_l$ of the corresponding split bridge 24. In other embodiments, the bottom side 28 of each of the one or more split bridges 24 is spaced apart from the bottom 22 of the groove 20 by a constant distance along the full split bridge length $24_l$.

As stated previously, it is appreciated that any top side and/or any bottom side of any split bridge, together or separately, may extend along any variable or non-linear path.

In the exemplary embodiment shown in FIGS. 1-3, each split bridge 24 and the top sides 32 thereof each extend along a non-linear path forming an alternating path alternating up and down along a zig-zagging path. In particular, in the exemplary embodiment shown, the split bridge 24 is formed by a pair of opposing projections 24A, 24B, the top side 32 of each projection of the pair of opposing projections 24A, 24B extends along the non-linear path substantially, that is, each top side 32 extends substantially along the same non-linear path. In extending along substantially the same non-linear path, in this instance, the top side 32 for each projection 24A, 24B is spaced apart from the outer, ground-engaging side 16 by substantially the same distance $V_1$ as each top side 32 extends along the non-linear path. In other exemplary embodiments shown in FIGS. 4A-4D, each of the top side 32 and bottom side 28 of each split bridge 24 extends along a non-linear path along the length $24_l$ of each corresponding split bridge 24. In the embodiment shown in FIG. 4A, the non-linear path is a zig-zagging path comprised of line segments forming peaks and troughs having a defined point where line segments connect. In the embodiment shown in FIG. 4B, the non-linear path is a zig-zagging path forming a single peak and trough. In the embodiment shown in FIG. 4C, the non-linear path is a sinusoidal path in which the peaks and troughs of the top side 32 are rounded. In the embodiment shown in FIG. 4D, the non-linear path is a stepped path forming a plurality of peaks and troughs. Each non-linear path in FIGS. 4A-4D alternates at least once between extending in different directions (upwards and downwards) of the groove depth $20_d$ to form at least one peak or trough or undulation. Thus, in these embodiments, the variable distance $V_1$ between the top side 32 of each split bridge 24 and the outer, ground-engaging side 16 of the tire tread 10 alternates one or more instances along a non-linear path, while the variable distance $V_2$ between the bottom side 28 and the groove bottom outer, ground-engaging side 16 for each split bridges 24 alternates one or more instances along a non-linear path. In particular, multiple peaks and/or troughs or undulations are provided along the non-linear path for each top and bottom side 32, 28 in FIGS. 4A, 4C, and 4D, while a single peak or trough is shown in FIG. 4B. In certain other embodiments, such as is shown in an exemplary embodiment in FIG. 4E, each of the top side 32 and bottom side 28 extends along a linear path along the length $24_l$ of the corresponding split bridge 24. In this embodiment, the variable distances $V_1$ and $V_2$ vary linearly.

Figure 4A:
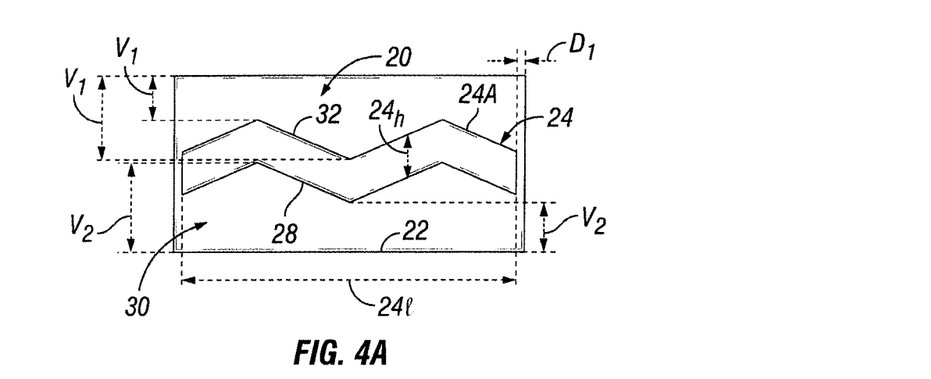
FIG. 4A is a side view of a split bridge similar to those shown in FIGS. 1-3.
Figure 4B:
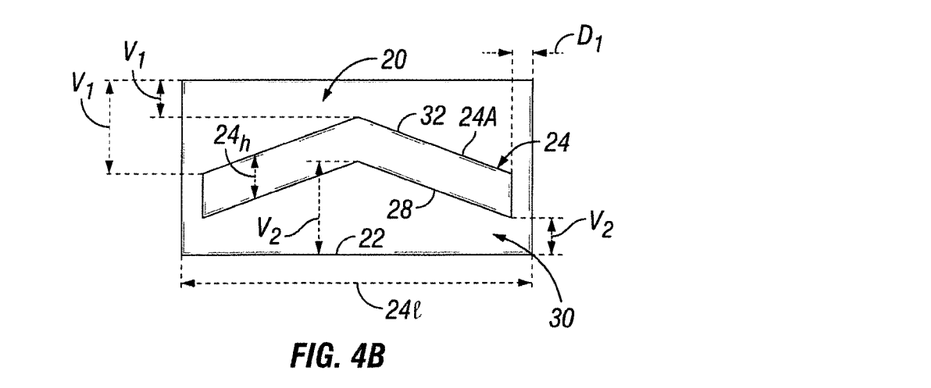
FIG. 4B is a side view of a split bridge arranged along a groove, in accordance with another embodiment of the invention.
Figure 4C:
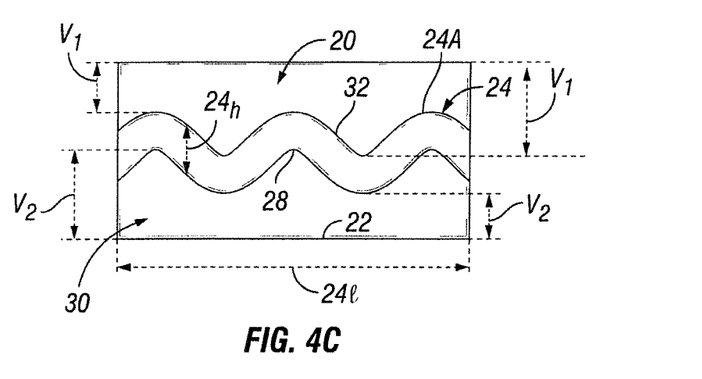
FIG. 4C is a side view of a split bridge arranged along a groove, in accordance with another embodiment of the invention.
Figure 4D:
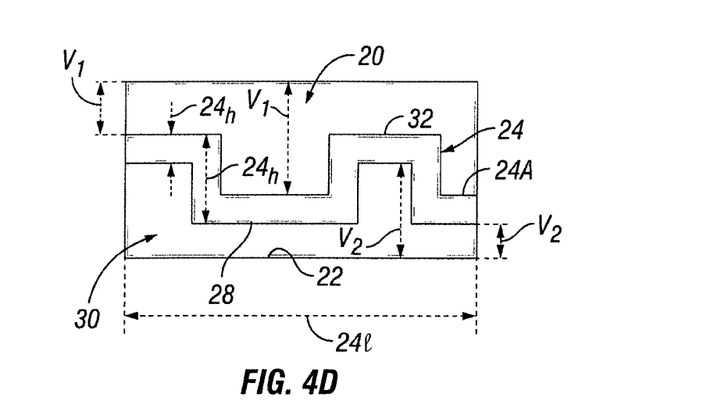
FIG. 4D is a side view of a split bridge arranged along a groove, in accordance with another embodiment of the invention.
Figure 4E:
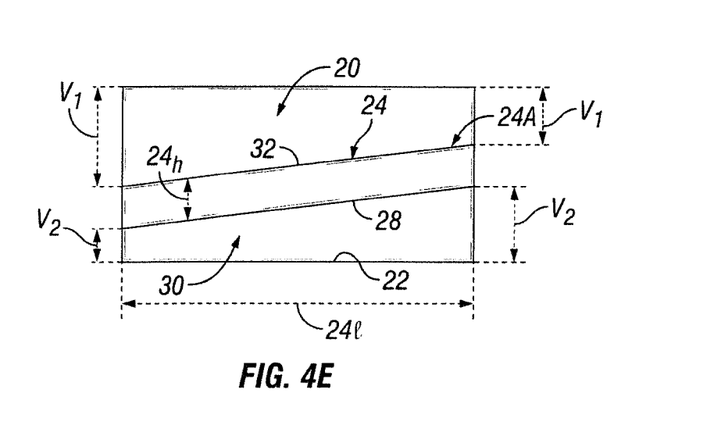
FIG. 4E is a side view of a split bridge arranged along a groove, in accordance with another embodiment of the invention.

With reference again to the embodiments in FIGS. 4A, 4B, and 4D, and other contemplated variations thereof, the angles formed by the segments forming the peaks and troughs or undulations of the top side 32 may be obtuse angles, acute angles, or right angles throughout the length $24_l$ of the corresponding split bridge 24. In further embodiments, the angles formed by the segments forming the peaks and troughs of the top side 32 may be a combination of obtuse angles, acute angles, or right angles throughout the length $24_l$ of the corresponding split bridge 24. In these embodiments, the obtuse angles, acute angles, or right angles may occur in a specific arrangement (e.g., alternating between obtuse and acute angles) or an arrangement without a defined pattern.

Regardless as to whether the top side and bottom side of each of the one or more split bridges extends along a linear or non-linear path, each of the one or more split bridges may have a constant or variable height. With reference to the embodiment shown in FIGS. 4A-4C and 4E, each split bridge 24 is shown to have a height $24_h$ that remains constant as each of the top side 32 and bottom side 28 extend along the length $24_l$ of each corresponding split bridge 24. Further, in each such embodiment, the top side 32 and bottom side 28 each extend along the same linear or non-linear path along the length $24_l$ of each corresponding split bridge 24. In these embodiments, if the path of each of the top side 32 and bottom side 28 of the corresponding split bridge 24 extend along a non-linear path, each of the top side 32 and bottom side 28 will also extend in the same directions of the depth $20_d$ of the groove 20 such that the one or more peaks and troughs or undulations formed on the top side 32 and bottom side 28 of the corresponding split bridge 24 are of equal dimensions and angles as each of the top side 32 and bottom side 28 of the corresponding split bridge 24 extends in the direction of the length $20_l$ of the groove 20. With reference to the exemplary embodiment shown in FIG. 4D, the split bridge 24 is shown to have a height $24_h$ that is variable as each of the top side 32 and bottom side 28 extend along the length $24_l$ of each corresponding split bridge 24. In particular, in this embodiment, the top side 32 and bottom side 28 extend along different non-linear paths along the split bridge length $24_l$. In other embodiments, the top side 32 may extend along any linear or non-linear path that is different than any linear or non-linear path by which the bottom side 28 of the corresponding split bridge 24 extends.

With reference generally to the figures, as each split bridge 24 has a length $24_l$ and a width $24_w$, each of the top and bottom sides 32, 28 has an area defined by the length $24_l$ and the width $24_w$ thereof. In certain embodiments, for any split bridge contemplated herein, a ratio of a total area of the top side of the split bridge to a total area of the bottom side of the bridge (that is, Area of Top Side÷ Area of Bottom Side) is in the range of 0.25 and 2.0 (that is, 0.25≤[Area of Top Side÷ Area of Bottom Side]≤2.0). In other embodiments, the ratio of the total area of the top side of the split bridge to the total area of the bottom side of the bridge is in the range of 0.25 and 1.0 (that is, 0.25≤[Area of Top Side÷ Area of Bottom Side]≤1.0).

As previously stated, when employing a split bridge, a void is arranged below any split bridge contemplated herein to promote water flow and water evacuation as well as relief of water pressure from the tire footprint during tire operation. For example, with reference to the exemplary embodiment shown in FIG. 2, the bottom side 28 of each of the one or more split bridges 24 is spaced apart from the bottom 22 of the groove 20 to form a void 30 between the corresponding split bridge 24 and the groove bottom 22. This void 30, which is also referred to as a submerged void, may be any size and shape including, but not limited to, rectangular, triangular, cylindrical, or teardrop-shaped. In the embodiment shown, the void 30 forms a groove extending the full length of the split bridge 24. With reference to the embodiments shown in FIGS. 4A to 4E, a void 30 is arranged beneath a projection for forming split bridge 24, where a bottom side 28 of the projection/split bridge is entirely spaced apart from the groove bottom 22, albeit spaced apart by a variable distance $V_2$. If one or more portions of the bottom side 28 extends to the groove bottom 22, then the void 30 does not extend the full length of the split bridge 24, and therefore reduces, but does not eliminate, its impact on improving hydroplaning performance. If the distance from the top side 32 of the split bridge 24 to the outer, ground-engaging side 16 of the tire tread 10 is staggered (i.e., unequal) on either side of the narrow gap 26, the volume of the void 30 for water absorption below the bottom side 28 of each of the one or more split bridges 24 is increased, and the risk of abrupt change in unpacked snow performance due to the top side 32 on either side of the narrow gap 26 coming into contact with a tire operating surface (e.g., the ground, a road, etc.) is reduced.

Figure 5:
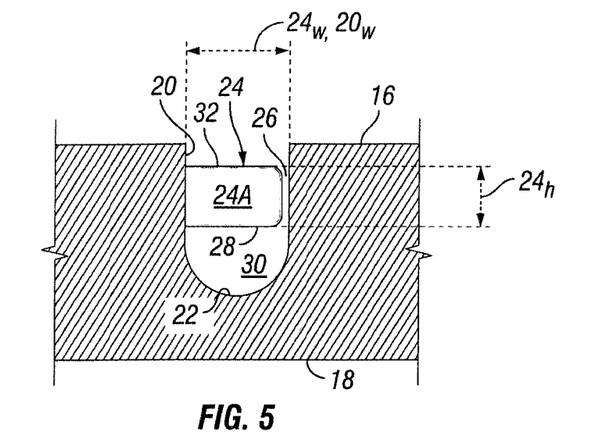
FIG. 5 is a cross-sectional view of a split bridge according to another embodiment of the invention.

It is appreciated, with reference to FIGS. 2, 5, and 7, the void 30 arranged between each of the one or more split bridges 24 and the bottom 22 of the groove 20 has a height extending in a direction of the tread thickness $T_t$. While the height of the void 30 can be any height that is less than or equal to the depth $20_d$ of the groove 20, in particular embodiments, the height of the void 30 is greater than or equal to 1 millimeter.

In this way, by analysis, it has been determined that the split bridges 24 as disclosed herein offer improved rolling resistance and shear stiffness performance, while also improving snow traction performance.

The terms "comprising," "including," and "having," or any variation thereof, to the extent used in the claims now or as may be used in any amendment thereto, unless otherwise defined, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the embodiments. Ranges that are described as being "between a and b" are inclusive of the values for "a" and "b" unless otherwise specified.

While various embodiments have been described herein and together with the accompanying drawings in particular instances, it shall be understood that such description is by way of exemplary illustration only and should not be construed as limiting the scope of any claimed invention as those with ordinary skill in the art will appreciate various modifications and alternatives could be developed in light of these descriptions. Accordingly, the scope and content of any claimed invention is to be defined only by the terms of the following claims, in the present form or as amended during prosecution or as pursued in any continuation application. Furthermore, it is understood that the features of any specific embodiment discussed herein may be optionally combined with one or more features of any one or more embodiments otherwise discussed or contemplated herein to form a different combination, unless otherwise stated.

What is claimed is:

1. A tire tread comprising:
    a tread width extending between a first lateral side edge and a second lateral side edge of the tire tread;
    a tread thickness extending from an outer, ground-engaging side of the tire tread to a bottom side of the tire tread, the tread thickness being perpendicular to the tread width;
    a tread length extending perpendicular to both the tread width and the tread thickness;
    a groove having a depth extending into the tread thickness from the outer, ground-engaging side of the tire tread and to a bottom thereof, the groove also having a length and a width, the length being dimensionally greater than the width, and the length, width, and depth being perpendicular to each other,
    one or more split bridges arranged in the groove, each of the one or more split bridges having a length extending in a direction of the groove length, a height extending in a direction of the groove depth, and a width extending across the width of the groove, each of the one or more split bridges having a discontinuity arranged along the width of the corresponding split bridge and extending fully across the length and height of the corresponding split bridge,
    each of the one or more split bridges having a bottom side arranged closest to the bottom of the groove, the bottom side being spaced apart from the bottom of the groove to form a void between the corresponding split bridge and the groove bottom,
    each of the one or more split bridges having a top side arranged closest to the outer, ground-engaging side of the tread, where at least a portion of the top side is spaced apart from the outer, ground-engaging side in the depth of the groove by a variable distance,
    where each of the one or more split bridges comprise a pair of mirrored projections extending from a pair of opposing sides of the groove defining the groove width, such that the discontinuity is arranged between a terminal end of each projection of the pair of projections and where each projection of the pair of projections is arranged opposite the other projection of the pair of projections substantially along the length of the split bridge,
    where the top side of each of the one or more split bridges extends along a non-linear path along the length of the corresponding split bridge, where the top side for each projection extends along the non-linear path substantially, where the top side for each projection extends substantially along the same non-linear path so that the top side of each projection is in phase, where the non-linear path is an alternating path in the groove depth direction, and where the top side of each projection is spaced apart from the outer, ground-engaging side by substantially the same variable distance as each top side extends along the non-linear path.

2. The tire tread of claim 1, where the discontinuity is a laceration.

3. The tire tread of claim 1, where the discontinuity is a narrow groove being 0.1 to 0.5 millimeter wide.

4. The tire tread of claim 1, where the one or more split bridges comprises a plurality of split bridges, such that the plurality of split bridges are arranged in a spaced-apart arrangement in the direction of the groove length.

5. The tire tread of claim 1, where the alternating path is a sinusoidal or stepped path.

6. The tire tread of claim 1, where for each of the one or more split bridges, the bottom side is spaced apart from the groove bottom by a variable distance.

7. The tire tread of claim 6, where the bottom side of each of the one or more split bridges extends along a non-linear path along the length of the corresponding split bridge, where the non-linear path is an alternating path.

8. The tire tread of claim 1, where each of the one or more split bridges has a constant height along its length.

9. The tire tread of claim 1, where each of the one or more split bridges has a variable height along its length.

10. The tire tread of claim 1, where a width of the discontinuity is equal to or less than 1.0 millimeters.

11. The tire tread of claim 1, where for each of the one or more split bridges, a ratio of an area of the top side of the corresponding split bridge to an area of the bottom side of the corresponding split bridge is between 0.25 and 2, inclusive.

12. The tire tread of claim 11, wherein the ratio is between 0.25 and 1, inclusive.

13. The tire tread of claim 1, where the void forms a groove.

14. The tire tread of claim 1, where the void extends fully along the length of the corresponding split bridge.

15. The tire tread of claim 1, where the tire tread is attached to a tire carcass to form a tire.

16. The tire tread of claim 1, where the claimed groove is a longitudinal groove.

* * * * *